(12) United States Patent
Barlin et al.

(10) Patent No.: US 8,407,218 B2
(45) Date of Patent: Mar. 26, 2013

(54) ROLE BASED SEARCH

(75) Inventors: David S. Barlin, Seattle, WA (US); Michael R. Dean, Seattle, WA (US); Agnita Pandian, Redmond, WA (US); Ian Peacock, Seattle, WA (US); Khurrum Malik, Redmond, WA (US); Jason Christopher Mayans, Bothell, WA (US); Teresa Beikie Mah, Bellevue, WA (US); Paul A. McDaniel, Bellevue, WA (US); Barry A. Shepherd, Seattle, WA (US); Steven Neil Silverman, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 623 days.

(21) Appl. No.: 12/329,284

(22) Filed: Dec. 5, 2008

(65) Prior Publication Data
US 2010/0145954 A1    Jun. 10, 2010

(51) Int. Cl.
G06F 7/00    (2006.01)
(52) U.S. Cl. .................... 707/732; 707/771
(58) Field of Classification Search .......... 707/732, 707/737, 771
See application file for complete search history.

(56) References Cited

U.S. PATENT DOCUMENTS

| | | | |
|---|---|---|---|
| 6,523,021 B1* | 2/2003 | Monberg et al. ............... | 1/1 |
| 6,778,982 B1* | 8/2004 | Knight et al. .................. | 707/737 |
| 7,428,522 B1 | 9/2008 | Raghunathan | |
| 7,792,835 B2* | 9/2010 | Bohannon et al. ............. | 707/737 |
| 2002/0010794 A1* | 1/2002 | Stanbach, Jr. et al. ........ | 709/245 |
| 2002/0055872 A1* | 5/2002 | LaBrie et al. .................. | 705/14 |
| 2003/0088553 A1 | 5/2003 | Monteverde | |
| 2005/0160083 A1 | 7/2005 | Robinson | |
| 2005/0278317 A1 | 12/2005 | Gross | |
| 2007/0192318 A1* | 8/2007 | Ramer et al. .................. | 707/7 |
| 2007/0208728 A1 | 9/2007 | Zhang | |
| 2007/0294225 A1 | 12/2007 | Radlinski | |
| 2008/0109422 A1 | 5/2008 | Dedhia | |
| 2010/0094699 A1* | 4/2010 | Beal ............................... | 705/14.25 |

OTHER PUBLICATIONS

"Role-Based Search Environment," http://direwolff.wordpress.com/2007/04/19/role-based-search-environment/, accessed Apr. 19, 2007, 6 pages.

Tachau, Joel, "Analysis of Three Personalized Search Tools in Relation to Information Search: iGoogle™, LeapTag™, and Yahoo!® MyWeb," University of Oregon Applied Information Management, Jun. 2007, 107 pages.

Trellian, "Keyword Discovery," © 2004-2008, accessed Sep. 29, 2008, 1 page.

* cited by examiner

*Primary Examiner* — James Trujillo
*Assistant Examiner* — Linh Black
(74) *Attorney, Agent, or Firm* — Merchant & Gould

(57) ABSTRACT

A computing device includes a processing unit, and a system memory connected to the processing unit. The system memory includes instructions that, when executed by the processing unit, cause the processing unit to create: a demographic identification module that retrieves demographic profile information associated with a user and identifies a relevant demographic category based on the demographic profile information; a population search module that categorizes search information from other users within the relevant demographic category as the other users search for information, the search information including search terms used by the other users and destination content reviewed by the other users; and a search result module that filters a search query from the user by applying the categorized search information for the relevant demographic category and presents filtered search results to the user.

16 Claims, 12 Drawing Sheets

ROLE BASED SEARCH

BACKGROUND

Text based searching of content has been aided much by electronic computers. Search results are commonly generated by computer-implemented search engines. Search engines are helpful in finding content stored on computers and networks. Search engines are particularly useful in sorting through the vastness of the Internet and the World Wide Web, but they are also used on intranets, smaller networks, and individual machines. Generally, search engines sort results using various methods and based on a number of criteria. Such criteria may include the creation date of particular content, its relevance, or the number of times it has been viewed.

Search engines fall into different categories, such as general purpose consumer oriented search engines and vertical search engines. Historically, general purpose search engines took a one size fits all approach to searching, though more modern solutions have attempted to personalize the search experience and tailor the search results. Vertical search engines are typically used with specific databases and can offer a greater degree of customization in order to find more relevant results. Vertical search engines are often limited in breadth compared to general purpose search engines.

SUMMARY

In one aspect, a computing device includes a processing unit, and a system memory connected to the processing unit. The system memory includes instructions that, when executed by the processing unit, cause the processing unit to create: a demographic identification module that retrieves demographic profile information associated with a user and identifies a relevant demographic category based on the demographic profile information; a population search module that categorizes search information from other users within the relevant demographic category as the other users search for information, the search information including search terms used by the other users and destination content reviewed by the other users; and a search result module that filters a search query from the user by applying the categorized search information for the relevant demographic category and presents filtered search results to the user.

In another aspect, a method of searching content includes: retrieving demographic information from an organization; creating a categorized demographic information repository including a plurality of demographic categories based on the demographic information; storing the demographic categories on a computing device; for each of the demographic categories, creating a search index including a plurality of search terms used by other individuals that are associated with a relevant demographic category of the plurality of demographic categories; for each of the demographic categories, creating a destination index including a plurality of destination content used by the other individuals that are associated with the relevant demographic category; and using the plurality of demographic categories to filter search results for a user associated with the relevant demographic category based on the search index and the destination index for the demographic category.

In yet another aspect, a computer-readable storage medium has stored computer-executable instructions that, when executed by a computing device, perform steps including: retrieving demographic information from a corporate directory; creating a categorized demographic information repository including a plurality of demographic categories based on the demographic information from the corporate directory; for each of the demographic categories, creating a search index including a plurality of search terms used by other individuals that are associated with a relevant demographic category of the plurality of demographic categories, the search terms being indexed from a high priority to a low priority based on usage; for each of the demographic categories, creating a destination index including a plurality of destination content used by the other individuals that are associated with the relevant demographic category, the destination content being indexed from a high priority to a low priority based on usage; and using the plurality of demographic categories to filter search results for a user associated with the relevant demographic category based on the search index and the destination index for the demographic category, including: receiving a search query from the user; automatically identifying the relevant demographic category associated with the user; performing a search based on the search query; creating a search filter based on demographic information associated with the user, the search filter being configured to prioritize search results, including: applying one or more of the plurality of search terms from the search index used by other individuals that are associated with the relevant demographic category to the search; and limiting the search results to results associated with the destination content from the destination index used by the other individuals that are associated with the relevant demographic category; filtering the search results using the search filter; and providing the filtered search results to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The present application is directed to system and methods for searching using demographic information and/or search term and destination site categorization to prioritize search results. Search term categorization and prioritization can enable users in particular demographic classes to benefit from the knowledge of the demographic class as a whole by leveraging search terms and destination sites visited by users of the demographic class as a whole.

Figure 1:
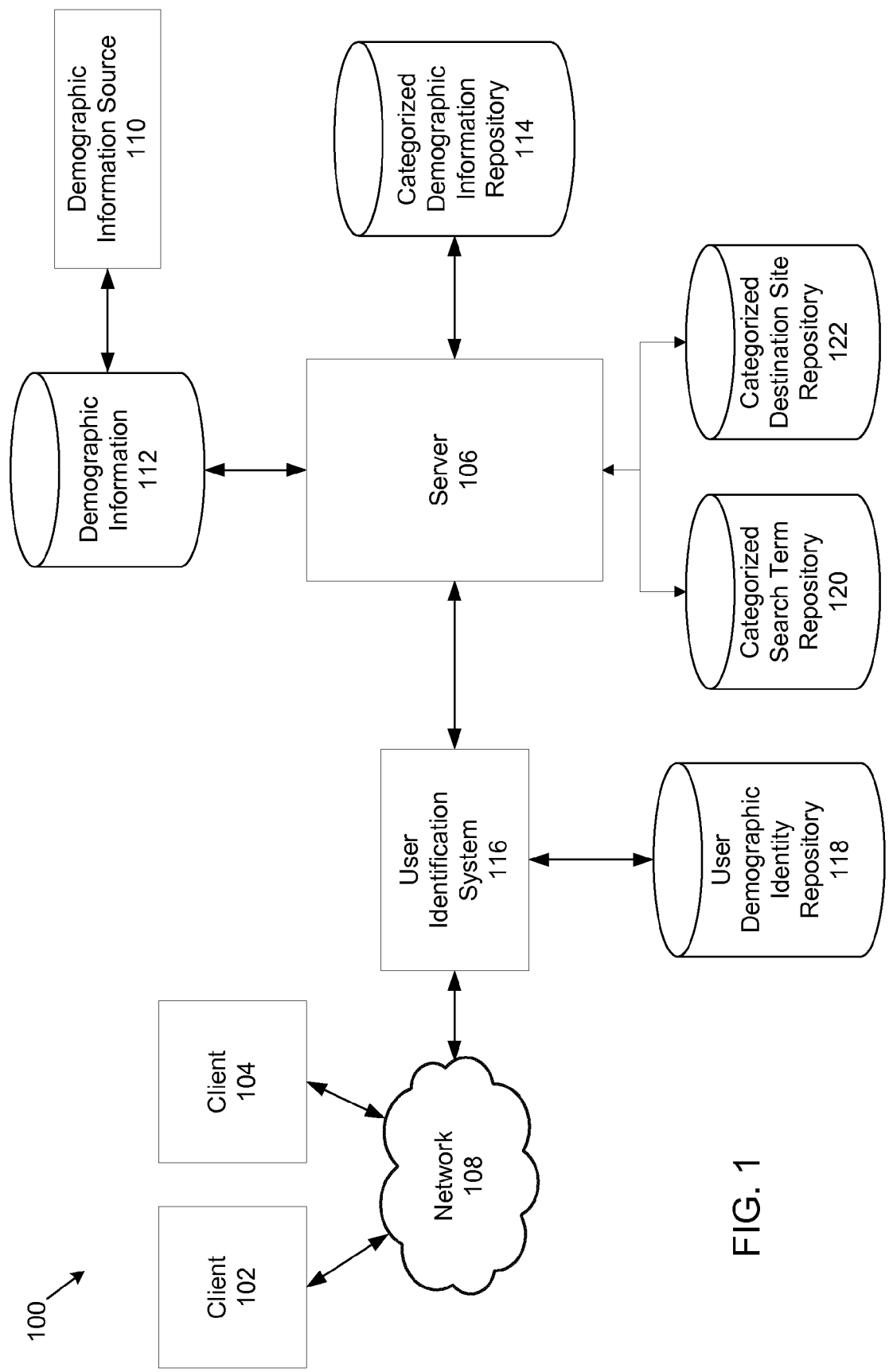
FIG. 1 shows an example system for prioritizing search results using demographic information and search term and destination site categorization.

FIG. 1 shows an example system for prioritizing search results using demographic information and/or search term and destination site categorization. The system 100 includes clients 102 and 104, a server 106, a network 108, and a demographic information source 110. Greater or fewer clients, servers, networks, and demographic information sources can be used.

In example embodiments, clients 102 and 104 are computing devices, such as desktop computers, laptop computers, terminal computers, personal data assistants, or cellular telephone devices. Clients 102 and 104 can include input/output devices, a central processing unit ("CPU"), a data storage device, and a network device.

Server 106 is accessible to clients 102 and 104 through network 108. Server 106 can include input/output devices, a central processing unit ("CPU"), a data storage device, and a network device. In example embodiments, network 108 is the Internet and clients 102 and 104 can access server 106 and resources connected to server 106 remotely.

Demographic information source 110 is a source of demographic information 112 about a segment of the population. Examples of pertinent demographic information included in the demographic information 112 include information relating to a corporation and information relating to the employees of the corporation, such as the employees' specific departments, responsibilities, roles, functions, job titles, job descriptions, and responsibility levels. In example embodiments, demographic information source 110 contains demographic information about the corporation and its employees.

Server 106 retrieves demographic information 112 from demographic information source 110. Demographic information 112 is analyzed and categorized into demographic categories by server 106 or another computing device. The demographic categories can overlap and need not be mutually exclusive.

Once demographic information 112 has been analyzed and categorized, it is stored in categorized demographic information repository 114. Categorized demographic information repository 114 is used to store the categorized demographic information 112 for later use. In example embodiments, categorized demographic information repository 114 may be included on server 106 in a variety of formats and on a variety of mediums. It may also be stored on a different server or across a multitude of servers.

In example embodiments, a user identification system 116 identifies users as they connect to the server through client 102 or client 104. In example embodiments, user identification system 116 identifies the user of clients 102 and 104 through the users' usernames and accounts. Server 106 uses user identification system 116 to identify individual users so that server 106 can track the search usage of users of clients 102 and 104.

In example embodiments, each user is assigned a unique demographic identity by user identification system 116 that is stored in user demographic identity repository 118. User demographic identity repository 118 is a repository that stores each individual user's unique demographic identity for later use. This unique demographic identity associates the user with one or more of the demographic categories found in categorized demographic information repository 114. In example embodiments, this demographic identity is anonymous, only containing information necessary for the proper function of system 100. In example embodiments, this unique demographic identity can be extracted from the demographic information source 110 and stored in user demographic identity repository 118. In other example embodiments, the user's unique demographic identity may be stored on the demographic information source 110 and accessed directly by the user identification system 116.

User identification system 116 can also be established as part of server 106, on another server, or at a different location. The user's unique demographic identity as identified by user identification system 116 and stored in user demographic identity repository 118, is used to create, maintain, and categorize a categorized search term repository 120 and a categorized destination site repository 122 using the demographic categories found in categorized demographic information repository 114.

In example embodiments, categorized search term repository 120 is a database containing search terms used by users of the system. The database is categorized by various demographic criteria, so that users sharing a particular demographic criterion can use the search terms most common to other users sharing that particular demographic criterion.

In example embodiments, categorized destination site repository 122 is a database containing destination sites visited by users of the system. In example embodiments, destination sites are those chosen from a search result list. It is also contemplated that destination sites could be any site visited by a user, whether or not it was visited from a result list. The database is categorized by various demographic criteria, so that users sharing a particular demographic criterion can use the destination sites most common to other users sharing that particular demographic criterion.

In example embodiments, the usage information of the user of client 102 is assigned to various demographic categories pertaining to the current user's unique demographic identity and added to categorized search term repository 120 and categorized destination site repository 122. This assignment will be discussed in further detail below.

Example server 106 typically includes at least one processing unit and system memory. Depending on the exact configuration and type of computing device, the system memory may be volatile (such as RAM), non-volatile (such as ROM, flash memory, etc.) or some combination of the two. The system memory typically includes an operating system suitable for controlling the operation of a networked personal computer, such as the WINDOWS® operating systems from Microsoft Corporation of Redmond, Wash. or a server, such as Windows Server 2008, also from Microsoft Corporation of Redmond, Wash. The system memory may also include one or more software applications and may include program data.

The server may have additional features or functionality. For example, the server may also include additional data storage devices including computer readable storage media (removable and/or non-removable) such as, for example, magnetic disks, optical disks, or tape. Computer readable storage media may include volatile and nonvolatile, removable and non-removable media implemented in any method or technology for storage of information, such as computer readable instructions, data structures, program modules, or other data. System memory, removable storage, and non-removable storage are all examples of computer readable storage media. Computer readable storage media includes, but is not limited to, RAM, ROM, EEPROM, flash memory or other memory technology, CD, DVD, Blu-Ray or other optical storage media, magnetic cassettes, magnetic tape, or other magnetic storage devices, or any other medium which can be used to store the desired information and which can be accessed by server 106. Any such computer storage media may be part of server 106. Server 106 may also have input device(s) such as a keyboard, mouse, pen, camera, voice input device, touch input device, etc. Output device(s) such as a display, speakers, printer, etc. may also be included.

Server 106 may also contain communication connections that allow the device to communicate with other computing devices (e.g., clients 102 and 104) over a network, such as network 108, in a distributed computing environment, for example, an intranet or the Internet. A communication connection is an example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media. The term computer readable media as used herein includes both storage media and communication media.

Clients 102 and 104 can be configured in a manner similar to that of server 106 above.

Figure 2:
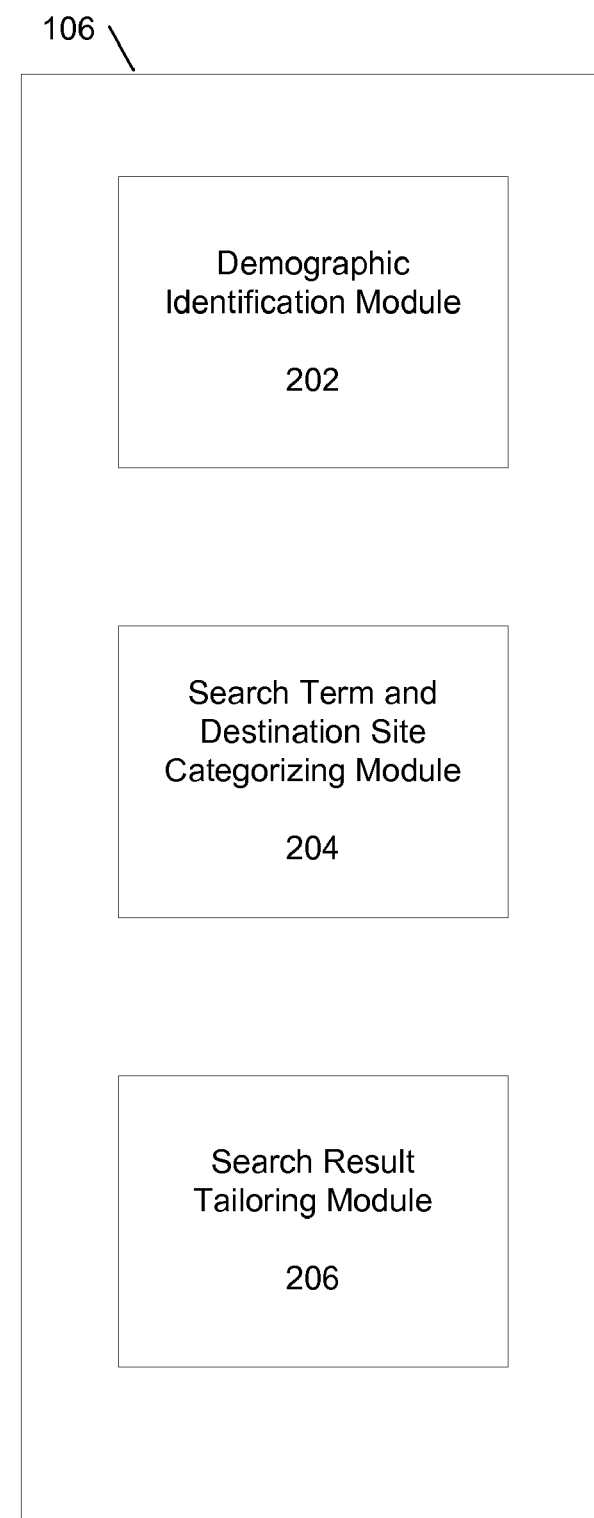
FIG. 2 shows an example server of the system of FIG. 1.

FIG. 2 shows a detailed view of the logical portions of server 106. Server 106 includes a demographic identification module 202, a search term and destination site categorizing module 204, and a search result tailoring module 206. In other example embodiments, all or some of the operation of these different modules can be spread across several servers or other computing devices.

Demographic identification module 202 retrieves, categorizes, and stores demographic information from a demographic information source. The demographic information is first retrieved from a demographic information source. Second, the demographic information is categorized based on at least one demographic criterion. Finally, the categorized demographic information is stored for later use.

Figure 3:
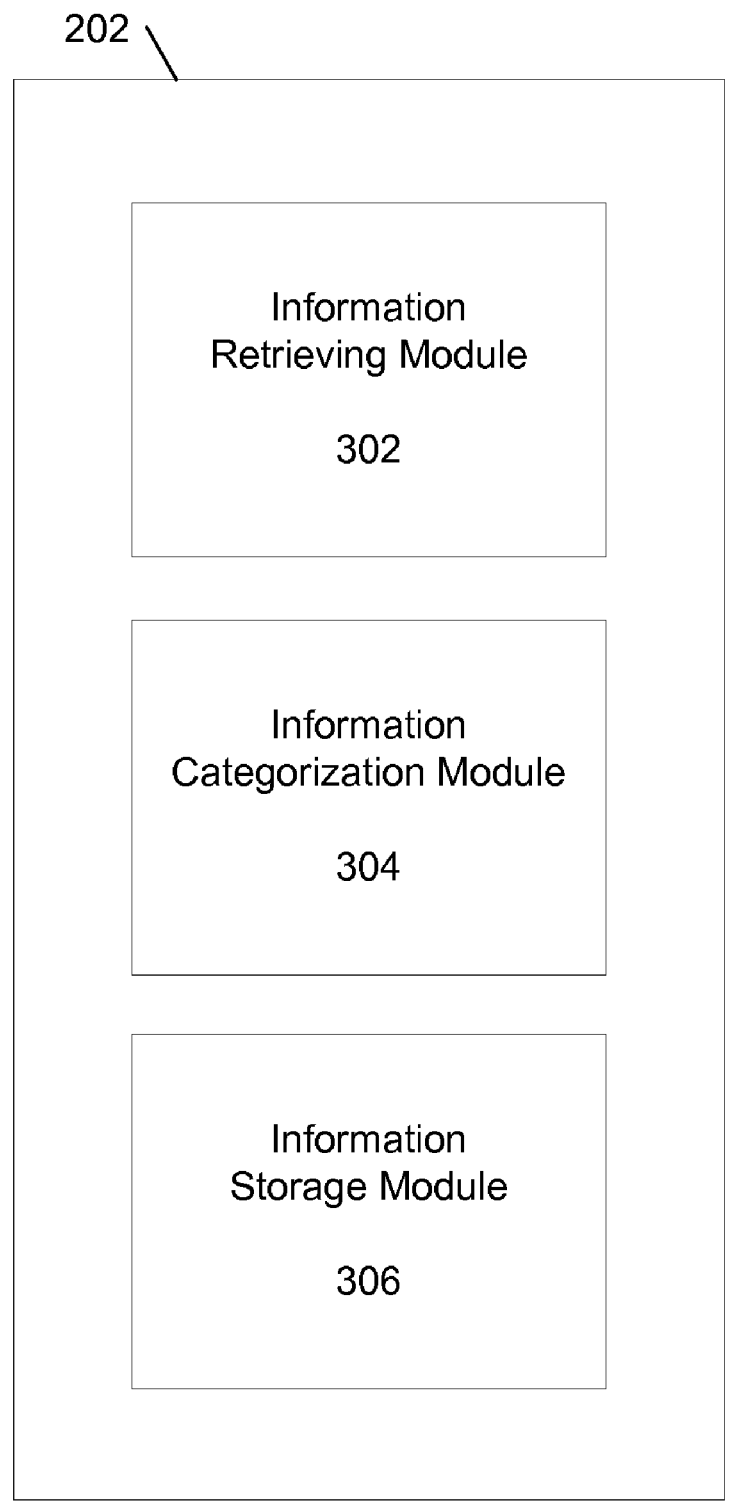
FIG. 3 shows an example demographic identification module of the server of FIG. 2.

FIG. 3 shows demographic identification module 202 of FIG. 2 in further detail. Demographic identification module 202 includes an information retrieving module 302, an information categorization module 304, and an information storage module 306.

Information retrieving module 302 is used to retrieve demographic information 112 from demographic information source 110. Specifically, demographic information source 110 contains demographic information about organizations, including businesses, institutions, and other legal entities. In example embodiments, demographic information source 110 is an employee directory server for a corporation. Specifically, the demographic information source could be a server running the ACTIVE DIRECTORY® directory service from Microsoft Corporation of Redmond, Wash.

In example embodiments, demographic information source 110 is a server running the ACTIVE DIRECTORY® directory service which contains a central list of all of a corporation's employees, as well as general information about the organization and specific information about each employee, including all employees' specific departments, responsibilities, roles, functions, job titles, job descriptions, and responsibility levels. This information is extracted by information retrieving module 302 from demographic information source 110 as demographic information 112.

In example embodiments, all personally identifiable information is removed from demographic information 112 to mitigate privacy concerns. In example embodiments, the information may be anonymized. Information about each individual in demographic information 112 is anonymized by being associated with an anonymized user id. Specifically, the anonymized user id can be designed so that it is difficult, if not impossible, to retrieve personal information about any particular individual from information associated with the anonymized user id or the anonymized user id itself.

Demographic information 112 can be stored in a variety of formats and on a variety of mediums. In example embodiments, demographic information 112 is only temporarily stored in its current state and is further processed by server 106 or another computing device in an information categorization module 304.

Information categorization module 304 is used to analyze and categorize extracted demographic information 112 received from information retrieving module 302. Demographic information 112 is analyzed and categorized by certain criteria, such as the organization's general field of operation and the employees' specific departments, responsibilities, roles, functions, job titles, job descriptions, and responsibility levels. For example, if an employee has the term "marketing" in her title, she may be categorized as belonging to the category "marketing." Similarly, if a different employee has the term "sales" in his title, he may be categorized as belonging to the category "sales."

Information storage module 306 is used to store the analyzed and categorized demographic information 112. As demographic information 112 is analyzed and categorized by information categorization module 304, it is stored for later use by information storage module 306 in categorized demographic information repository 114. Categorized demographic information repository 114 may be local on media attached to server 106 or remote on a different server or other device.

Referring back to FIG. 2, search term and destination site categorizing module 204 creates, maintains, and indexes search term and destination site repositories. Search term and destination site repositories are used to keep track of the search terms used and destination sites visited by members of particular demographic categories. The repositories are indexed so that the most relevant search terms and destination sites for a particular demographic category receive higher priority than less relevant search terms and destination sites.

Figure 4:
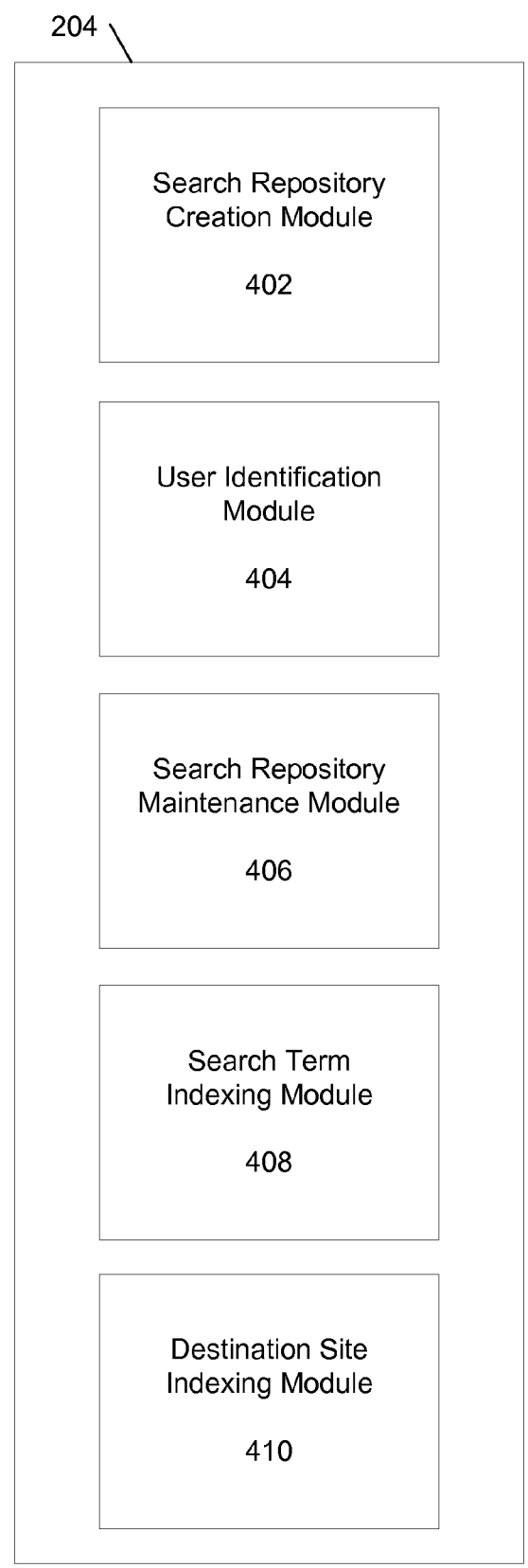
FIG. 4 shows an example search term and destination site categorizing module of the server of FIG. 2.

FIG. 4 shows search term and destination site categorizing module 204 of FIG. 2 in further detail. Search term and destination site categorizing module 204 includes a search repository creation module 402, a user identification module 404, a search repository maintenance module 406, a search term indexing module 408, and a destination site indexing module 410.

Search repository creation module 402 is used to establish one or more search repositories. In example embodiments, the categorized search term repository 120 and the categorized destination site repository 122 are created. Categorized search term repository 120 and categorized destination site repository 122 are cross referenced with one another. In other embodiments, a single categorized repository is created for both search terms and destination sites or a multitude of categorized repositories could be created. Alternatively, other example embodiments may have either a categorized search term repository 120 or a categorized destination site repository 122, but not both. It is also contemplated that other categorized repositories covering other aspects of searching might also be created.

User identification module 404 is used to identify the user of client 102 or 104. When client 102 connects to server 106, user identification module 404 receives the current user's unique demographic identity from user identification system 116. In other embodiments, server 106 can determine user's unique demographic identity itself, without user identification system 116. The current user's unique demographic identity can be determined based on her worksite user id, by another user id (such as a WINDOWS LIVE™ ID, a GOOGLE™ Account id, or Yahoo! ID), by manual selection by the user, or by some other means.

Search repository maintenance module 406 is used to maintain the search repositories created by search repository creation module 402. When a user of client 102 initiates a search, the search terms used in the search query are received by server 106 and added to categorized search term repository 120 by search repository maintenance module 406. Categorized search term repository 120 contains information about specific search terms used, by whom the terms are used, and with what frequency members of a particular business demographic category use the terms. This information is collected, stored, and maintained at various layers of abstraction, from narrower categories, such as the specific job title or description at a particular corporation to all the people in "sales" at all corporations in the industry.

After every search is performed in example embodiments, the categorized destination site repository 122 is updated by search repository maintenance module 406. Each time the user of client 102 selects a particular website to view from search results, categorized destination site repository 122 is updated by search repository maintenance module 406. Further, search repository maintenance module 406 cross references the categorized search term repository 120 and categorized destination site repository 122.

Search repository maintenance module 406 continually updates and maintains categorized search term repository 120 and categorized destination site repository 122. In example embodiments, there are separate search repository maintenance modules to maintain the categorized search term repository 120 and categorized destination site repository 122. In example embodiments, there is only a single categorized repository and the search repository maintenance module 406 will only create, update, and maintain that single categorized repository. In example embodiments, there could be any number of categorized repositories and any number of search repository maintenance modules.

Search term indexing module 408 is used to index the search terms received by server 106 from client 102, and all other clients, during every search. The search terms are indexed by occurrence, so that the most commonly used search terms for a particular demographic category are indexed higher than less commonly used search terms in that same demographic category. Specifically, in one embodiment, each search term used by a specific demographic category is compared against all other search terms used by the specific demographic category. Search term indexing module 408 calculates the percentage of searches run with a particular search term in a specific demographic category out of the total searches ran for that particular search term across all the demographic categories combined. For example, the term "clinical trial" might be included in 0.5 percent of all searches done by the demographic category "medical professionals," but is only included in about 0.001 percent of searches for an average user.

In other embodiments, search term indexing module 408 examines all of the search terms for which there was a satisfactory click through pattern. The click through pattern is not a satisfactory click through pattern if the user misspells the word and is prompted with an alternate spelling and chooses the alternate spelling. For example, many medical professionals might mistype "clinical trial" by typing "clinecal trial." This would lead to no click through for the search term "clinecal trial." In example embodiments, search term indexing module 408 presents the user who mistyped "clinical trial" as "clinecal trial" with a prompt indicating the correct spelling of "clinical trial" as a potential alternative search query. In example embodiments, search term indexing module 408 prompts the user with a "did you mean" prompt before the correct spelled search term. In example embodiments, only the successful searches are indexed. In other embodiments, the search terms can be indexed by some other criterion.

In example embodiments, search term indexing module 408 indexes the frequency which people in the same demographic categories, such as people in the same field, job titles, and departments or with the same responsibilities, roles, functions, job descriptions, and responsibility levels, search particular terms. As always, this list is not exhaustive and other criteria could also be used to categorize and index. Search term indexing module 408 can also keep track of the frequency of each search term in the aggregate compared against other search terms. In example embodiments where there is no categorized search term repository 120 or a combined repository, search term indexing module 408 may be omitted.

As discussed above, server 106 will determine in search term indexing module 408 which search terms are most representative of a specific demographic category by comparing which words are used most often in that specific demographic category. Search terms used most frequently in a particularly demographic category may be useful to the members of that demographic category when the users are searching for information. In essence, the categorizing and indexing of search terms in categorized search term repository 120 is a way of identifying what have proven to be successful search terms for a particular demographic category. Thus, users who need assistance with forming their searches using terms relevant to their demographic categories will be able to benefit from the search expertise of others in their demographic categories. Thus, each demographic category will have its own unique set of search terms, indexed highest to lowest. As users continue to use the search, the indexes will become more refined and will continually lead to better results.

For example, the term "patent" may be used primarily by patent attorneys, paralegals, patent agents, and patent examiners in the legal and patent procurement fields. The term "patent" would likely be ranked higher by search term indexing module 408 in these demographic categories than it would in the demographic categories established for employees of a hospital. Similarly, the term "stent" may primarily be used by doctors, nurses, and medical device manufactures in the medical and medical device manufacture fields. Thus, the term "stent" would rank higher in these demographic categories than it would in the demographic categories of employees of an advertising agency.

Along the same lines, the phrase "product placement" may primarily be used by account managers, creative designers, and commercial photographers at an advertising agency, but it may also be used by in house marketing and advertising employees of a food processing corporation. The term "product placement" may rank higher in the demographic categories of account managers at the advertising agency, than it would of the in house marketers of the food processing corporation, but it would rank higher in the demographic category for the in house marketers than it would in a demographic category containing accountants at the same food processing corporation.

As demonstrated above, a particular search term may index higher for one particular job title, such as salesperson, than it would for another job title, such as accountant. A particular search term may also index higher for a particular responsibility level than it would for another. For example, a seasoned partner at an accounting firm may have a substantially different index for the term "earned income" than does a newly employed accounting associate.

In specific embodiments, destination site indexing module 410 is used to index the destination sites visited by the user of client 102. In example embodiments, the destination sites are indexed by occurrence, so that the most commonly visited destination sites for a particular demographic category are indexed higher than less commonly visited destination sites in that demographic category. It is contemplated that the destination sites could also be indexed using other criteria, including relevance, authoritativeness, language, etc. Destination site indexing module 410 indexes the frequency at which people in the same demographic category visit particular sites in the results list. Demographic categories may include those in the same field, job titles, and departments or people with the same responsibilities, roles, functions, job descriptions, and responsibility levels. It can also keep track of the frequency at which each site in the result list is visited in the aggregate. Thus, each demographic category will have its own unique set of destination sites, indexed highest to lowest.

In example embodiments, destination site indexing module 410 only indexes sites visited by users. Specifically, a destination site will not be added to the destination site index by destination site indexing module 410 until a user has actually visited it. In example embodiments, destination site indexing module 410 indexes sites after they have received a quality visit. Specifically, a site is added to the destination site index by destination site indexing module 410 if the user does not return to the search results quickly after visiting the destination site. Because users can often quickly discern upon visiting a destination site whether it is a good or bad result, this is a reliable indicator of the quality of the visit. In example embodiments, the quality of destination sites can also be determined by the users themselves through a ranking process. For example, each user is able to rank destination sites after visiting them by organizing, editing, and/or annotating the search results in the results list, as well as sharing such information with other users.

The destination sites visited most frequently in a particular demographic category may be useful to the members of that demographic category when searching for information. In essence, the categorizing and indexing of destination sites in categorized destination site repository 122 is a way of identifying what have proven to be useful destination sites for a particular demographic category.

Referring back to FIG. 2, search result tailoring module 206 creates search filters and implements the search filters usage in a user interface. Search filters are created for particular demographic categories based on the indexes in the search term and destination site repositories. The search filters are created so that results that contain the search terms indexed highest for the particular demographic category will be prioritized above other results. The filters are also created so that results with higher priority in the destination site index will be prioritized above other results.

Figure 5:
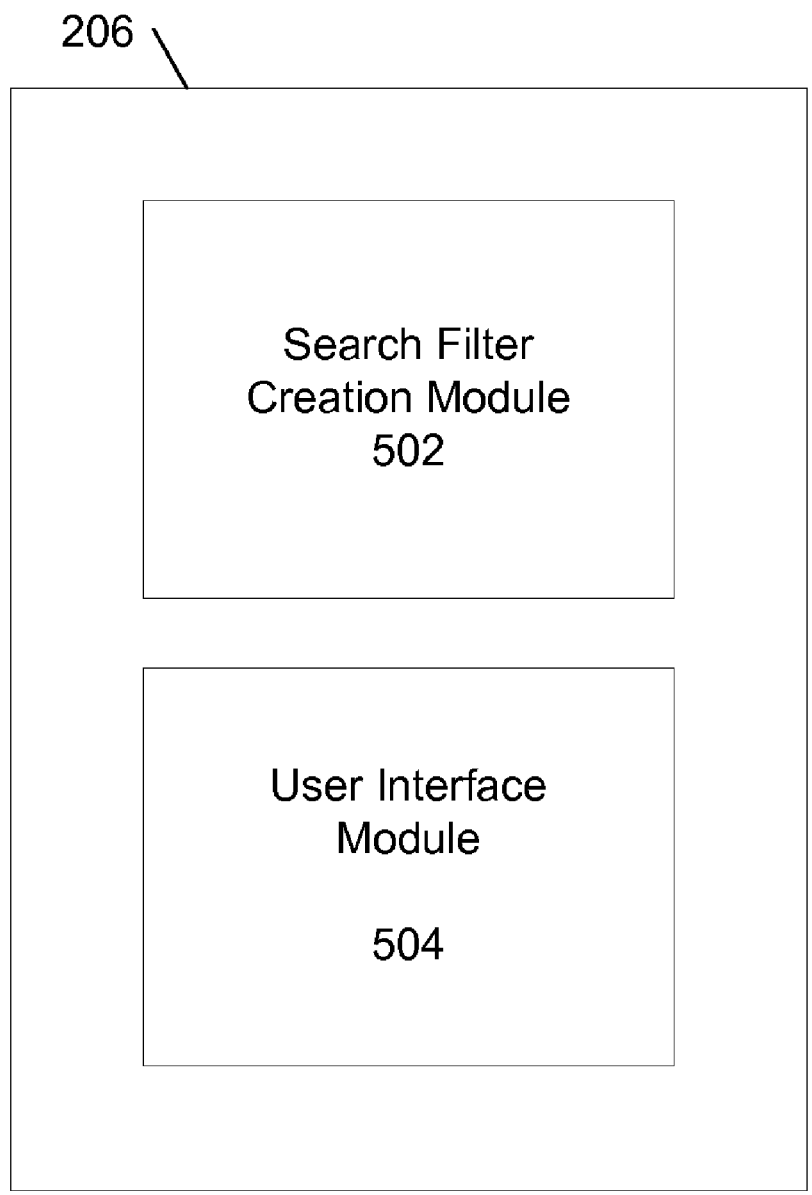
FIG. 5 shows an example search result tailoring module of the server of FIG. 2.

FIG. 5 shows search result tailoring module 206 of FIG. 2 in further detail. Search result tailoring module 206 includes a search filter creation module 502 and a user interface module 504.

In example embodiments, search filter creation module 502 creates search filters for particular demographic categories. In example embodiments, these filters are search macros. The filters are created using information found in categorized demographic information repository 114 and both categorized search term repository 120 and categorized destination site repository 122. The filters enable prioritization of search results based on particular search terms and destination sites having various indexes for the particular demographic categories of the current user of client 102. A single user might fall into more than one demographic category and filters will be tailored appropriately to accommodate multiple demographic categories by search filter creation module 502.

For example, search filters tailored for automobile sales staff and automobile mechanics will likely produce more similar results than search filters tailored for automobile sales staff and computer sales staff. But, the search filters tailored for automobile sales staff and computer sales staff would likely produce more similar results than search filters tailored for automobile sales staff and computer repair technicians. Thus, both small and large distinctions between the demographic identities of particular users will influence which filter they will use as a default.

In example embodiments, the filters created by search filter creation module 502 use an algorithm which takes into account the search terms and destination sites indexed highest for the user's particular demographic categories. The algorithm creates a filter which will sort the results of a search by placing sites higher in the search results that include the higher ranked search terms from categorized search term repository 120 and the higher ranked destination sites from categorized destination site repository 122.

User interface module 504 enables the user of client 102 to run a search tailored to the user's demographic category by using a search filter created by search filter creation module 502. In example embodiments, user interface module 504 allows the user to use the default filter created for her based on her unique demographic identity as determined by user identification system 116 and user identification module 404.

Applicants also contemplate that the user can switch from her default filter to use a more appropriate filter on a temporary or indefinite basis. In example embodiments, the user can change from using the filter corresponding to her unique demographic identity by modifying all or some of her unique demographic identity. In example embodiments, after a user modifies her unique demographic identity, information about her future searches will be categorized by demographic identification module 202 and by search repository maintenance module 406 using the user's modified demographic identity. In other embodiments, when the user modifies her unique demographic identity it does not affect the operation of demographic identification module 202 or search repository maintenance module 406. In this case, information about her future searches will continue to be categorized based on her default unique demographic identity by server 106 in demographic identification module 202 and search repository maintenance module 406.

Figure 6:
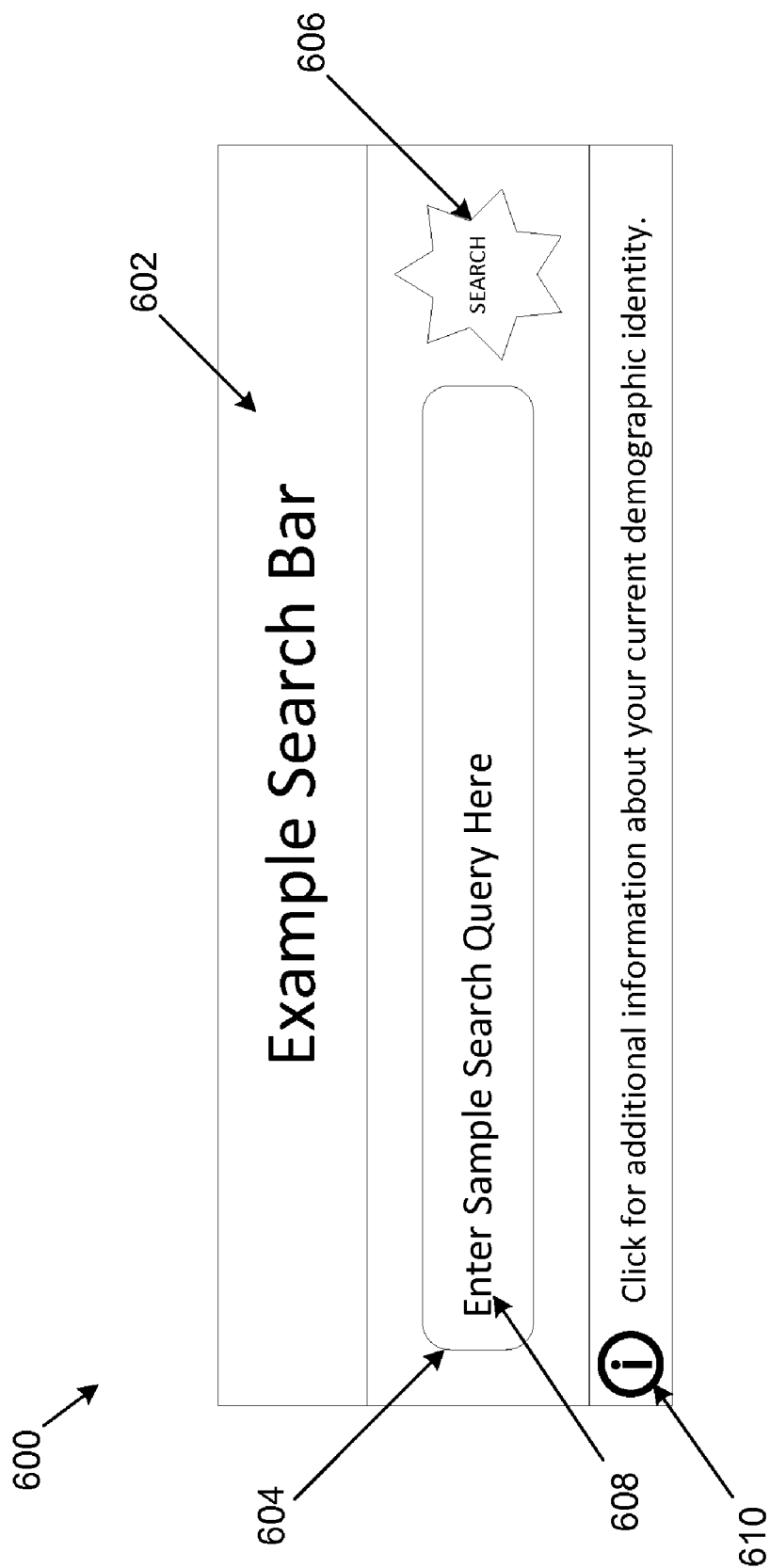
FIG. 6 shows an example embodiment of the search user interface.

FIG. 6 shows an example embodiment of a search user interface 600 where the user's demographic identity is not shown. The example search user interface 600 includes an identification bar 602 and a search query bar 604 into which a user inputs search terms. Search user interface 600 also includes a search button 606, which is clickable by the user.

Once the user has inputted appropriate search terms, the user can click search button 606. Once search button 606 is pressed, the query is sent to user interface module 504 on server 106.

In example embodiments, user interface module 504 receives the query and performs a search using a search filter correlating with the user's unique demographic identity. For example, in one embodiment, user interface module 504 receives the query from the user and appends additional demographic category tailored terms and rules to the query before initiating the search. For example, if a member of a "medical professional" demographic category searches for "Advil," rules are appended to the query to prefer results including "clinical trial" and "New England Journal of Medicine." The search is run with the modified query, resulting in tailored results.

In example embodiments, user interface module 504 receives the query from the user and performs the search, displaying the unfiltered results. In addition to the unfiltered results, the user interface module 504 suggests refinements based on the user's demographic category or categories. For example, user interface module 504 suggests refinements to a search for "Advil" by a member of a "medical professional" demographic category. Specifically, user interface module 504 may prompt the user that she may be looking for Advil Clinical Trials of that she may find the results she is looking for in the Journal of the American Medical Association, the New England Journal of Medicine, etc.

In example embodiments, the default listing from the search is manipulated at the server level to be relevant to the user's demographic categories and the search term and destination site indexes. The user can be presented with alterative spellings of words that appear to be mistyped. In specific embodiments, these alternative spellings are customized based on the user's specific demographic categories. For example, when the search term "tent" is included in a search query done by a member of a "medical professional" demographic category, user interface module 504 suggests the alternative spelling "stent" because "stent" is a term indexed in the medical professional index, while "tent" is not.

The results of the search are displayed in search user interface 600 by user interface module 504. In other embodiments, the results of the search are displayed in other places, such as a new browser window displayed on client 102, in a specific search results window displayed on client 102, or in a specific toolbar component of a piece of business software (such as the OUTLOOK® messaging and collaboration client, Word, or POWERPOINT® presentation graphics program, all by Microsoft Corporation of Redmond, Wash.).

Example search user interface 600 also contains an information toggle button 610 which allows the user to toggle between showing the user's current demographic information or not. FIG. 6 shows search user interface in a state where the user's current demographic identity information is not displayed. When information toggle button 610 is pressed, the search user interface is updated to show the user's current demographic identity information. In example embodiments, information toggle button 610 is also visually changed to indicate whether the toggle is set to show the user's current demographic identity information or not.

Figure 7:
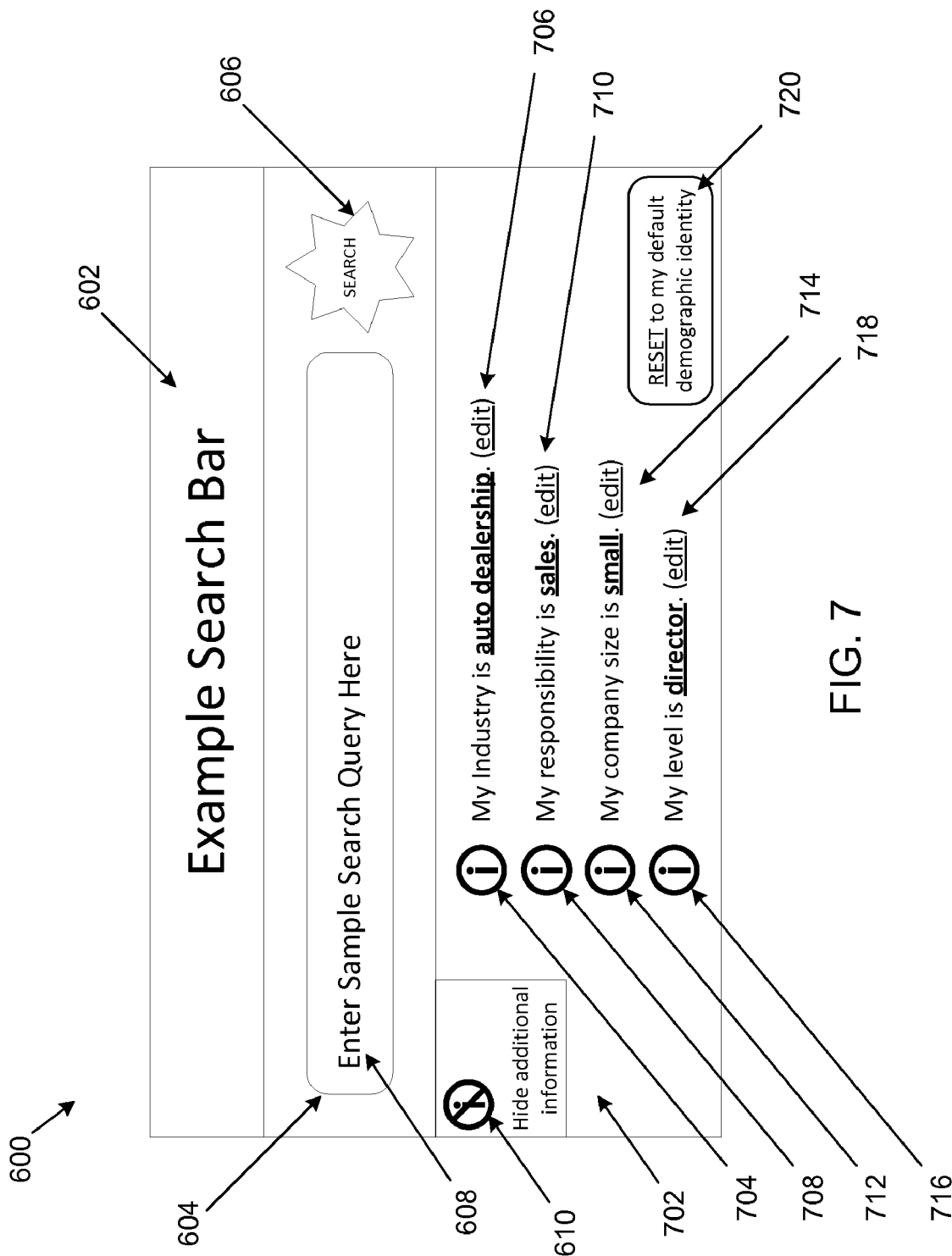
FIG. 7 shows another example embodiment of the search user interface of FIG. 6 with the user's demographic identity shown.

FIG. 7 shows an example embodiment of a search user interface 600 where the user's demographic identity is shown. In this example embodiment, the information toggle button 610 has been pressed and the user's current demographic identity information is shown in user demographic identity status section 702. Information toggle button 610 has been visually changed to indicate that the user's current demographic identity information is being shown and that the user can press the information toggle button 610 to switch search user interface 600, so that the user's current demographic identity information is not shown, as in FIG. 6.

In example embodiments, user demographic identity status section 702 includes status information about the user's industry on user industry status line 704. In the example search user interface 600 shown in FIG. 7, user industry status line 704 indicates that the user's industry is "auto dealership." A user industry edit link 706 allows the user to override and change her industry.

User demographic identity status section 702 includes status information about the user's responsibilities on user responsibility status line 708. In the example search user interface 600 shown in FIG. 7, user responsibility status line 708 indicates that the user's responsibility is "sales." A user responsibility edit link 710 allows the user to override and change her responsibility. User demographic identity status section 702 includes status information about the user's company size on user company size status line 712. In the example search user interface 600 shown in FIG. 7, user company size status line 712 indicates that the user's company size is "small." A user company size edit link 714 allows the user to override and change her company size.

User demographic identity status section 702 includes status information about the user's responsibility level on user responsibility level status line 716. In the example search user interface 600 shown in FIG. 7, user responsibility level status line 716 indicates that the user's level is "director." A user responsibility level edit link 718 allows the user to override and change her level.

A user may indicate she desires to modify her demographic identity by toggling the search user interface 600 to see more information using information toggle button 610. Once toggled, search user interface 600 will look similar to FIG. 7. It will show user demographic identity status section 702, where the user can see user industry status line 704, user responsibility status line 708, user company size status line 712, and user responsibility level status line 716. In other embodiments, more or fewer demographic options can be displayed in user demographic identity status section 702.

Each demographic option is editable and may be temporarily or indefinitely modified by the user. In example embodiments, the user industry status shown on user industry status line 704 can be modified by selecting the user industry edit link 706. The user responsibility status shown on user responsibility status line 708 can be modified by selecting the user responsibility edit link 710. The user company size shown on user company size status line 712 can be modified by selecting the user company size edit link 714. The user's responsibility level shown on user responsibility level status line 716 can be modified by selecting the user responsibility level edit link 718. Any other available user demographic options could also be modified in a similar way.

User demographic identity status section 702 also includes a reset to default demographic identity button 720. When clicked by a user, reset to default demographic identity button 720 resets any modified demographic information to the user's default settings gathered earlier through demographic identification module 202 and associated with the user by user identification system 116 and user identification module 404.

Figure 8:
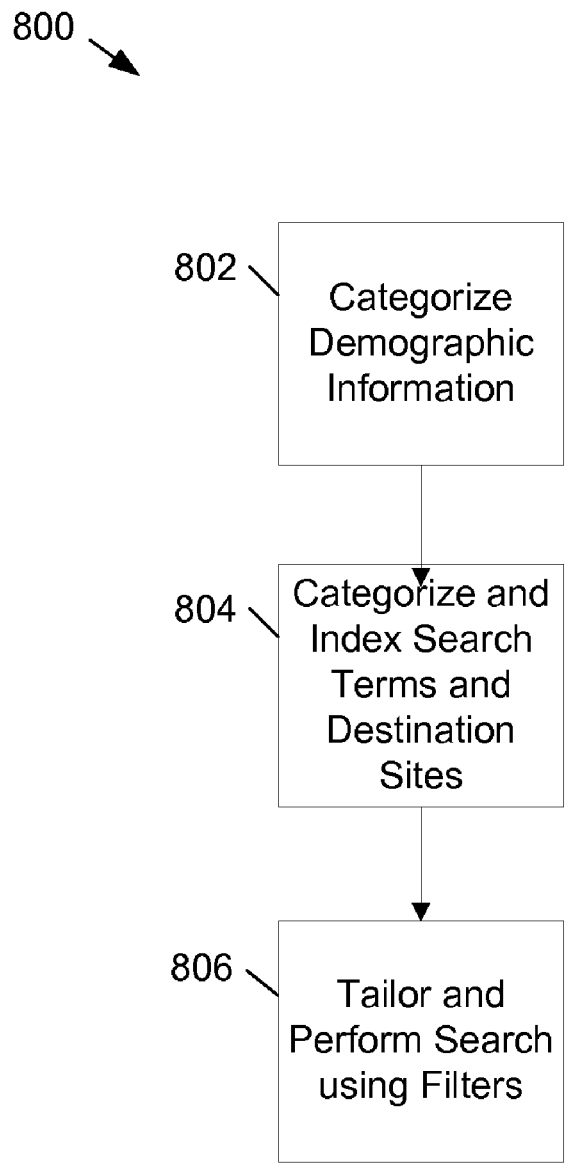
FIG. 8 shows a flowchart of an example method for creating prioritized search results based on demographic information and search term and destination site categorization.

FIG. 8 shows an example flowchart of a method 800 for creating prioritized search results based on demographic information and search term and destination site categorization. Method 800 for creating prioritized search results can be broken down into three sub-processes: a process 802 for categorizing demographic information, a process 804 for categorizing and indexing search terms and destination sites, and a process 806 for tailoring and performing a search using filters. Each of these sub-processes is described in further detail below.

Figure 9:
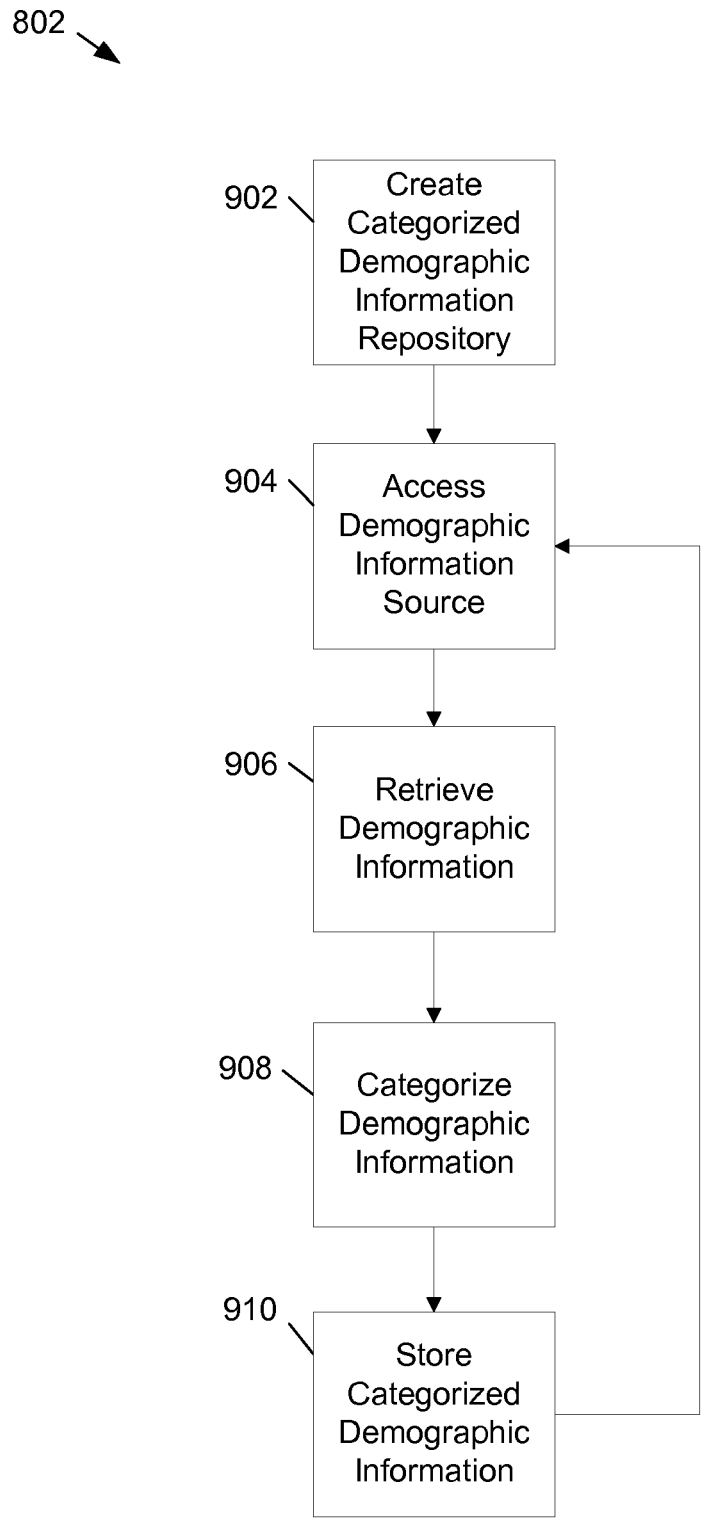
FIG. 9 shows the process for categorizing demographic information from the method of FIG. 8.

FIG. 9 shows the process 802 for categorizing demographic information in more detail. At operation 902, server 106 creates a categorized demographic information repository 114. At operation 904, demographic information source 110 is accessed by server 106. For example, server 106 can connect to an Active Directory server. At operation 906, server 106 retrieves demographic information 112 from demographic information source 110. Demographic information 112 can be retrieved according to example information retrieving module 302 of server 106 described above. For example, server 106 can retrieve demographic information from an Active Directory server, including a central list of all an organization's employees, as well as general information about the organization, including general field of operation and size, and the employees' specific departments, responsibilities, roles, functions, job titles, job descriptions, and responsibility levels. Information can also be retrieved from other demographic information sources, including websites and industry databases.

At operation 908, server 106 categorizes demographic information 112. Demographic information 112 can be categorized according to example information categorization module 304 of server 106 described above. At operation 910, server 106 stores the categorized demographic information. Information can be stored in categorized demographic information repository 114 according to example information storage module 306 of server 106. In example embodiments, operation 904, operation 906, operation 908, and operation 910 are repeated for a number of different organizations, by accessing demographic information from each organization's Active Directory server and other demographic information sources.

Figure 10:
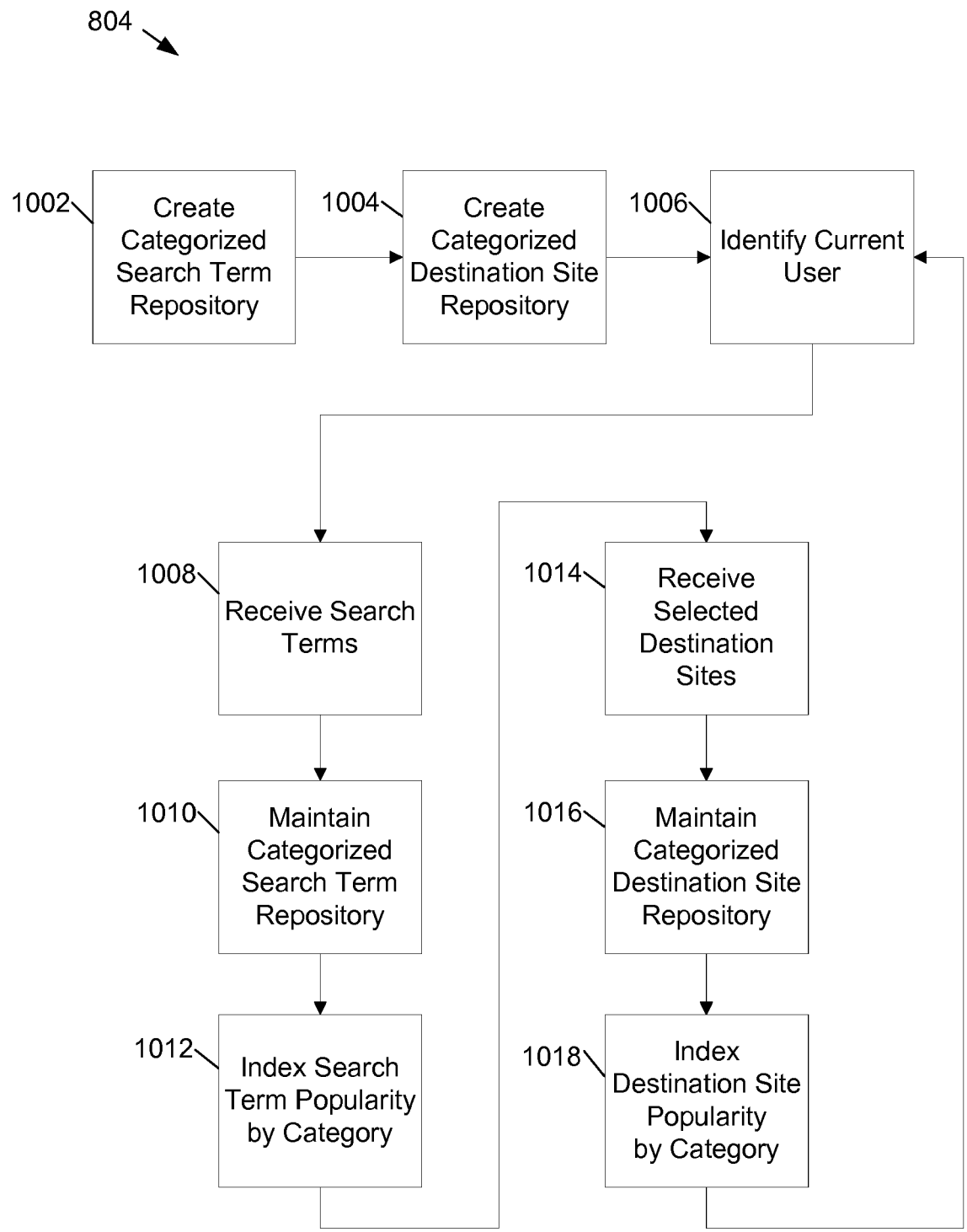
FIG. 10 shows the process for categorizing and indexing search terms and destination sites from the method of FIG. 8.

FIG. 10 shows a flowchart of example process 804 for categorizing search terms and destination sites. At operation 1002, categorized search term repository 120 is created. Categorized search term repository 120 can be created according to example search repository creation module 402. At operation 1004, categorized destination site repository 122 is created. Categorized destination site repository 122 can be created according to example search repository creation module 402. At operation 1006, the current user is identified by server 106 and user identification system 116. In example embodiments, the current user can be identified according to example user identification module 404.

At operation 1008, server 106 receives a search term from client 102. In example embodiments, applicants contemplate that the search term can be checked against search terms already found in categorized search term repository 120 and if the term was not already in categorized search term repository 120, server 106 might suggest another possible search term that was contained in categorized search term repository 120. This ability of the system would help users who were not sure how to spell a particular term or who misspelled the term in the search. Alternative word suggestions might be particularly useful if the alternative words suggested were chosen from those indexed with higher priorities as discussed below.

At operation 1010, server 106 maintains categorized search term repository 120. Categorized search term repository 120 can be maintained according to example search repository maintenance module 406. For example, the search term is added to categorized search term repository 120 if it is not already present. Next, the demographic categories pertaining to the current user's unique demographic identity are properly associated with the search term in the categorized search term repository 120 using various criteria, such as the organization's general field of operation and the employees' specific departments, responsibilities, roles, functions, job titles, job descriptions, and responsibility levels. If the current search term was already present in categorized search term repository 120, the demographic categories pertaining to the current user's unique demographic identity are properly associated and aggregated with the pre-existing categorized demographic information associated with that particular search term in categorized search term repository 120.

At operation 1012, categorized search term repository 120 is indexed by search term popularity in each demographic category. Operation 1006 can be carried out according to example search term indexing module 408. In other embodiments, categorized search term repository 120 could be indexed by other criteria.

In example embodiments, once the user of client 102 has initiated a search, a list of search results is displayed to the user. In example embodiments, the search results relate to World Wide Web based content. The user can then select which content to view and which web pages to visit. Though example embodiments focus on searches performed on the World Wide Web, the same system and methods can be used for searches on other networks and computing devices, including the Internet generally and intranets. In example embodiments, the user clicks on a particular link, and is taken to the particular destination site associated with the link. Destination sites include web sites, web pages, and other content. In specific embodiments, destination sites could also include network accessible files of any types.

At operation 1014, the user selected destination sites are received from client 102 by server 106. At operation 1016, server 106 maintains categorized destination site repository 122. Categorized destination site repository 122 can be maintained according to example search repository maintenance module 406. For example, the destination site is added to categorized destination site repository 122 if it is not already present. Next, the demographic categories pertaining to the current user's unique demographic identity are properly associated with the destination site in the categorized destination site repository 122 using various criteria, such as the organization's general field of operation and the employees' specific departments, responsibilities, roles, functions, job titles, job descriptions, and responsibility levels. If the current search term was already present in categorized destination site repository 122, the demographic categories pertaining to the current user's unique demographic identity are properly associated and aggregated with the pre-existing categorized demographic information correlated with that particular search term in categorized search term repository 120.

At operation 1018, categorized destination site repository 122 is indexed by destination site popularity in each demographic category. Operation 1018 can be carried out according to example destination site indexing module 410. In other embodiments, destination site repository 122 could be indexed by other criteria.

Once operation 1018 is completed, server 106 returns to operation 1006, where it identifies the current user again and proceeds with the retrieval, categorization and indexing of both search terms and destination sites in operations 1008, 1010, 1012, 1014, 1016, and 1018. Though example process 804 for categorizing search terms and destination sites shows certain operations happening before other operations, it is contemplated that these operations can be performed in other orders as well. For example, operation 1014 may immediately follow operation 1008 and come before operations 1010 and 1012. Further, operation 1018 may occur before operation 1012, operation 1016 may occur before operation 1010, etc.

Figure 11:
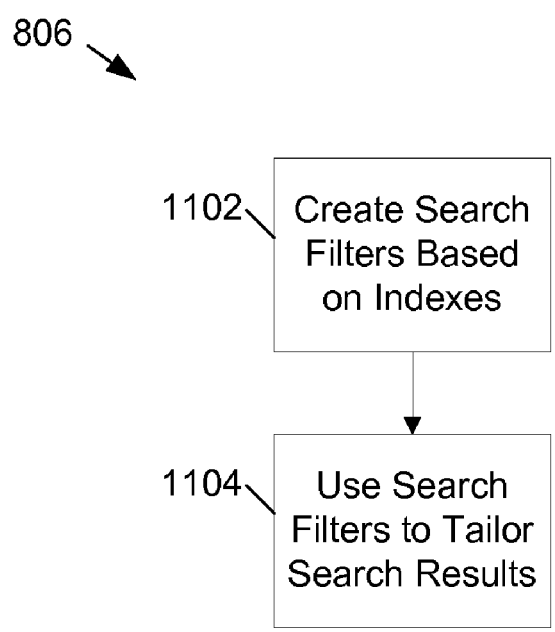
FIG. 11 shows the process for tailoring a search using demographic information and search term and destination site categorization from the method of FIG. 8.

FIG. 11 shows a flowchart of example process 806 for tailoring and performing a search using filters. At operation 1102, search filters are created based on the indexes created in categorized search term repository 120 and categorized destination site repository 122 as applied to the current user's unique demographic identity. Operation 1102 can be carried out according to example search filter creation module 502.

At operation 1104, search filters are used to tailor the search results from a user's search. Operation 1104 can be carried out according to example user interface module 504. In example embodiments, the user's demographic classification can be modified by the user according to the example embodiment of a search user interface 600 shown in FIG. 7 and described above.

Figure 12:
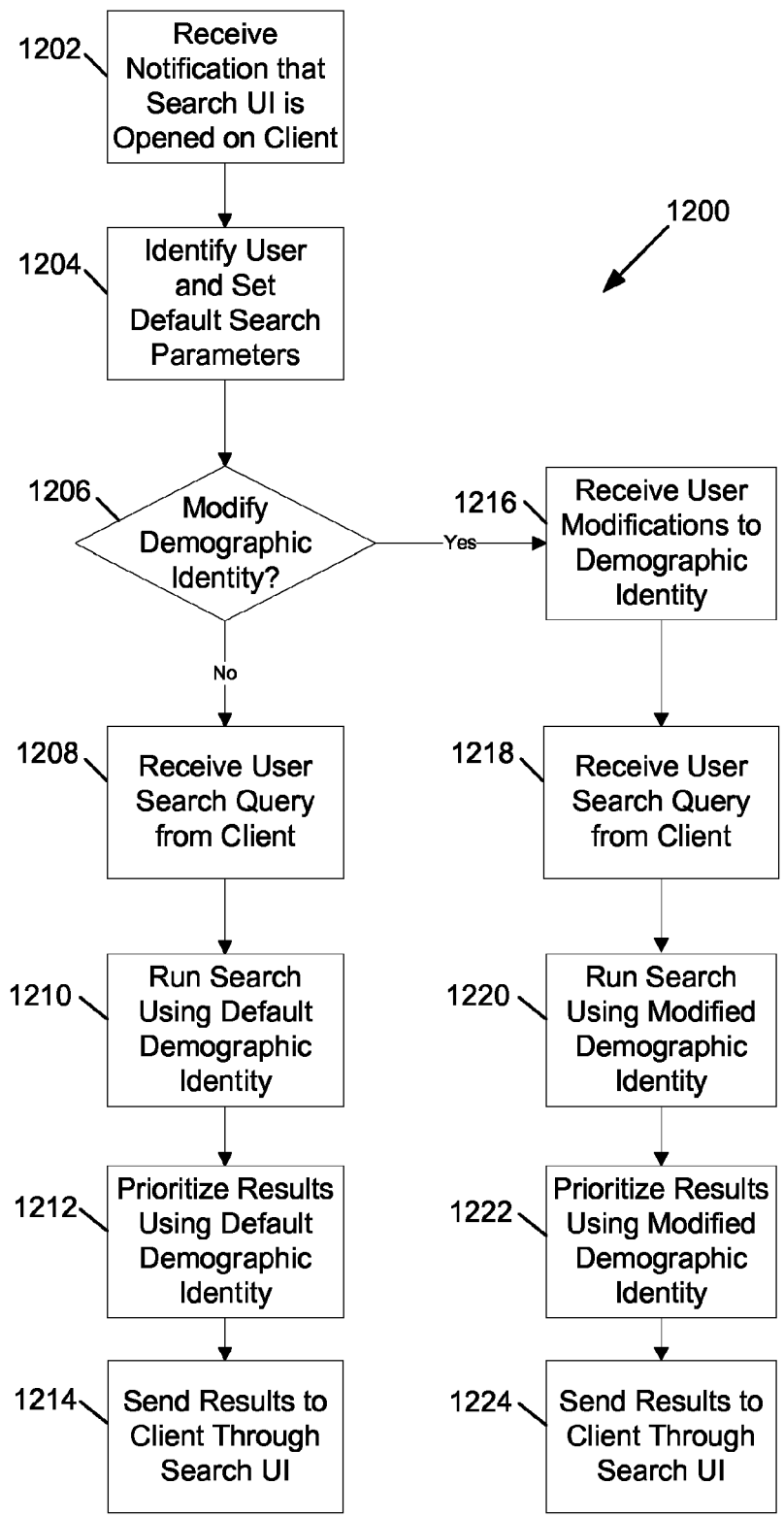
FIG. 12 shows a flowchart for an example method for using a system employing an example embodiment of a role based search according to the present disclosure.

FIG. 12 shows a flowchart for an example method for using a system employing an example embodiment of a role based search 1200 according to the present disclosure. At operation 1202, server 106 receives notification that the search user interface 600 has been opened on client 102. In example embodiments, the user interface can function according to the example embodiment of a search user interface 600 shown in FIGS. 6 and 7 and described above. It is also possible that the search user interface 600 be implemented in other ways, including as part of a web site, as an element of a world wide web browser (such as Microsoft Internet Explorer, MOZILLA® FIREFOX®, APPLE® SAFARI®, or GOOGLE™ Chrome), or integrated into an Email Client (such as MICROSOFT® OUTLOOK®, MICROSOFT® WINDOWS® Mail, or MICROSOFT® WINDOWS LIVE™ Mail, IBM® LOTUS NOTES®, NOVELL® GROUPWISE®, APPLE® Mail, or MOZILLA® THUNDERBIRD™).

At operation 1204, server 106 identifies the user and sets her default search parameters. In example embodiments, the user identification is facilitated by user identification system 116 and can be performed according to user identification module 404. In example embodiments, the user can be identified through use of her user account while logged into client 102. In other embodiments, the user can log into a centralized user account server to be identified by means of a user id (such as a WINDOWS LIVE™ ID, a GOOGLE™ Account id, or Yahoo! ID). At decision 1206, server 106 receives any requests from client 102 to modify the user's unique demographic identity. If a request is not received to modify the user's demographic identity, the user's search query is received by server 106 at operation 1208. In example embodiments, the search query can include words, numerals, and characters and can be refined using Boolean operators. A default search is run using the user's default demographic identity at operation 1210. At operation 1212, server 106 uses the filters described above to prioritize the search results based on the user's default demographic identity. Finally, the search results based on the user's default demographic identity are sent to client 102 at operation 1214.

If at decision 1206, server 106 receives a request from client 102 to modify the user's demographic identity, then server 106 receives user modifications to demographic identity from client 102 at operation 1216. Once server 106 receives user modifications to demographic identity at operation 1216, the user's search query is received by server 106 at operation 1218. In example embodiments, the search query can include words, numerals, and characters and can be refined using Boolean operators. A modified search is run using the user's modified demographic identity at operation 1220. At operation 1222, server 106 uses the filters described above to prioritize the search results based on the user's modified demographic identity. Specifically, the search will be run with a different filter than the one used in operation 1212. The new filter corresponds to the user's modified demographic identity instead of her default demographic identity. Finally, the search results based on the user's modified demographic identity are sent to client 102 at operation 1224.

Though the preceding systems and methods are focused on being used in the creation of filters allowing users to conduct a role based search, the same principles can be used in other applications. For example, the systems and methods of this disclosure could be adapted to allow for role targeted advertising, specifically role targeted search advertisements and role targeted display advertisements. In another example embodiment, the systems and methods above could be adapted to allow for role based interactivity in developer communities.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device, comprising:
 a processing unit; and
 a system memory connected to the processing unit, the system memory comprising instructions that, when executed by the processing unit, cause the processing unit to create:
  a demographic identification module that retrieves demographic profile information, including at least vocation status information, associated with a user and identifies a relevant demographic category based on the demographic profile information, the relevant demographic category being modifiable by the user by adjustment of the demographic profile information via a user interface including:
   a first element that is selectable by the user to change a current industry status of the user displayed in the user interface;
   a second element that is selectable by the user to change a current responsibility status of the user displayed in the user interface;
   a third element that is selectable by the user to change a company status of the user displayed in the user interface;
   a fourth element that is selectable by the user to change a position level status of the user displayed in the user interface;
   a fifth element that is selectable by the user to reset the demographic profile information to a default setting; and
   a sixth element that is selectable by the user to at least temporarily remove the first element, second element, third element, and fourth element from display within the user interface;
  a population search module that categorizes search information from other users within the relevant demographic category as the other users search for information, the search information including search terms used by the other users and destination content reviewed by the other users; and
  a search result module that filters a search query from the user by applying the categorized search information for the relevant demographic category and presents filtered search results to the user.

2. The computing device of claim 1, wherein the population search module obtains demographic information from a demographic information source accessible by the computing device, and stores the search information in a plurality of demographic categories based on the demographic information.

3. The computing device of claim 2, wherein the population search module extracts the demographic information from a corporate directory, and the population search module identifies the plurality of demographic categories by analyzing the demographic information from the corporate directory.

4. The computing device of claim 1, wherein the population search module indexes search terms for the relevant demographic category based on usage of the search terms by the other users associated with the relevant demographic category, and the population search module indexes the destination content based on usage of the destination content by the other users associated with the relevant demographic category.

5. The computing device of claim 4, wherein the search terms are indexed so that the search terms that are used more often receive higher priority.

6. The computing device of claim 4, wherein the destination content is indexed so that the destination content used more often receives higher priority.

7. The computing device of claim 4, wherein the search result module suggests alternative spellings for one or more of the search terms based on the relevant demographic category.

8. The computing device of claim 1, wherein the search result module filters the search query from the user by applying the search terms used by the other users in the relevant demographic category to the search query, and by limiting the filtered search results to a subset of the destination content reviewed by the other users in the relevant demographic category.

9. A method of searching content, the method comprising:
retrieving demographic information from an organization;
creating a categorized demographic information repository including a plurality of demographic categories based on the demographic information;
storing the demographic categories on a computing device;
for each of the demographic categories, creating a search index including a plurality of search terms used by other individuals that are associated with a relevant demographic category of the plurality of demographic categories;
for each of the demographic categories, creating a destination index including a plurality of destination content used by the other individuals that are associated with the relevant demographic category;
using the plurality of demographic categories to filter search results for a user associated with the relevant demographic category based on the search index and the destination index for the relevant demographic category;
allowing the user to change the relevant demographic category by selection of a link that permits the user to change a vocation status, and selection of a button that permits the user to reset the vocation status to a default setting; and
assigning a first priority to a first search term in the search index and second priority to a second search term in the search index based on usage of the first and second search terms by the other individuals that are associated with the relevant demographic category.

10. The method of claim 9, further comprising:
receiving a search query from the user;
performing a search based on the search query;
creating a search filter based on demographic information associated with the user, the search filter being configured to prioritize the search results;
filtering the search results using the search filter; and
providing the filtered search results to the user.

11. The method of claim 10, wherein creating the search filter further comprises applying one or more of the plurality of search terms from the search index used by the other individuals that are associated with the relevant demographic category to the search.

12. The method of claim 10, wherein creating the search filter further comprises limiting the search results to results associated with the plurality of destination content from the destination index used by the other individuals that are associated with the relevant demographic category.

13. The method of claim 10, wherein creating the search filter further comprises:
applying one or more of the plurality of search terms from the search index used by the other individuals that are associated with the relevant demographic category to the search; and
limiting the search results to results associated with the plurality of destination content from the destination index used by the other individuals that are associated with the relevant demographic category.

14. The method of claim 10, further comprising automatically identifying the relevant demographic category associated with the user.

15. The method of claim 14, wherein identifying the relevant demographic category associated with the user includes examining demographic information associated with the user.

16. A computer-readable storage device comprising stored computer-executable instructions that, when executed by a computing device, perform steps comprising:
retrieving demographic information from a corporate directory;
creating a categorized demographic information repository including a plurality of demographic categories based on the demographic information from the corporate directory;
for each of the demographic categories, creating a search index including a plurality of search terms used by other individuals that are associated with a relevant demographic category of the plurality of demographic categories, the plurality of search terms being indexed from a high priority to a low priority based on usage;
for each of the demographic categories, creating a destination index including a plurality of destination content used by the other individuals that are associated with the relevant demographic category, the plurality of destination content being indexed from a high priority to a low priority based on usage;
using the plurality of demographic categories to filter search results for a user associated with the relevant demographic category based on the search index and the destination index for the relevant demographic category, including:
receiving a search query from the user;
automatically identifying the relevant demographic category associated with the user;
performing a search based on the search query;

creating a search filter based on demographic information associated with the user, the search filter being configured to prioritize the search results, including:
  applying one or more of the plurality of search terms from the search index used by the other individuals that are associated with the relevant demographic category to the search; and
  limiting the search results to results associated with the plurality of destination content from the destination index used by the other individuals that are associated with the relevant demographic category;
filtering the search results using the search filter; and
providing the filtered search results to the user; and
allowing the user to change the relevant demographic category by adjustment of a demographic profile information via an interface including: at least one link that when selected permits the user to change a vocation status; and a button that when selected permits the user to reset the vocation status to a default setting.

* * * * *